United States Patent [19]
Williamson, Jr.

[11] Patent Number: 4,484,668
[45] Date of Patent: Nov. 27, 1984

[54] CONTROLLER FOR VEHICLE RETARDER
[75] Inventor: Felton Williamson, Jr., Fraser, Mich.
[73] Assignee: Master Pneumatic-Detroit, Inc., Sterling Heights, Mich.
[21] Appl. No.: 503,531
[22] Filed: Jun. 13, 1983
[51] Int. Cl.³ .................. F16F 11/00; B60K 41/20
[52] U.S. Cl. .................. 188/271; 188/290; 303/40; 303/68
[58] Field of Search ............... 188/290, 296, 294, 291, 188/292, 293, 295, 271, 170; 303/2, 3, 40, 68, 84, 1, 71; 192/4 B, 57

[56] References Cited
U.S. PATENT DOCUMENTS 4,324,320  4/1982  Spurlin et al. .................. 188/271
4,421,212  12/1983  Fleck .................. 188/290 X
4,440,272  4/1984  Bieber .................. 188/290

Primary Examiner—Douglas C. Butler
Attorney, Agent, or Firm—Barnes, Kisselle, Raisch, Choate, Whittemore & Hulbert

[57] ABSTRACT

A pneumatic controller for actuating a retarder of the motion of a vehicle. Inlet and exhaust valves are actuated by a pair of diaphragms responsive to the pressure of the air applied to the brakes of a vehicle and the pressure of the air actuating the retarder. The valves are preferably on a common stem and operatively associated with the diaphragms by an actuator rod responsive to the resultant of forces produced by both of the diaphragms.

21 Claims, 2 Drawing Figures

CONTROLLER FOR VEHICLE RETARDER

FIELD OF THE INVENTION

This invention relates to vehicle braking or the stopping of the motion of a vehicle and more particularly to the controller for a retarder of a vehicle.

BACKGROUND OF THE INVENTION

The motion of many heavy duty vehicles such as trucks, buses and off-the-road equipment is stopped by an air brake system. The motion of many of these vehicles is also slowed down by a retarder used in conjunction with the air brakes. The useful life of the air brakes is increased by use of the retarder to slow down the vehicle because it decreases the amount of wear on the friction elements and other components of the air brakes.

Typically, the retarder is a torque converter connected by a suitable drive train to the drive wheels of the vehicle. Usually the vehicle is also driven by an engine through this same drive train. Sometimes the same torque converter is used both to couple the engine to the drive wheels for moving the vehicle and when the air brakes are applied to assist in retarding movement of and stopping the vehicle.

After the air brakes are initially applied and substantial braking of the vehicle has occurred, the retarder is also energized to assist in slowing down and stopping the vehicle. The retarder is turned fully on by an electro-mechanical control to assist in slowing down the vehicle. After the maximum braking effort produced by the air brakes begins to decrease, which usually occurs before the vehicle comes to a stop, the retarder is turned fully off.

This turning on and off of the retarder provides a sufficiently abrupt change in the rate at which the vehicle is slowed down that many drivers object to the feel of the brake and retarder system and many passengers in vehicles such as buses are uncomfortable.

SUMMARY OF THE INVENTION

In brief, this invention is a pneumatic controller of a retarder for slowing movement of a vehicle. To decrease wear on the brakes and provide improved passenger comfort and driver feel of the air brake and retarder system, this controller energizes and applies the retarder at a faster rate than the rate at which the air brakes are initially applied and initiates de-energization or disengagement of the retarder only after the air brakes have been almost completely released. This is accomplished by operating inlet and exhaust valves by a pair of diaphragm assemblies which interact with each other and respond to the pressure of air applied to the brakes and to the retarder.

Objects, features and advantages of this invention are to provide a controller for a retarder which enhances passenger comfort and driver feel during braking of the vehicle, energizes the retarder in proportion to the force applied by the driver to the vehicle brake pedal, substantially increases the useful service life of the vehicle air brakes, is simple, reliable, of economical manufacture and assembly, and requires a minimum of maintenance and service.

BRIEF DESCRIPTION OF THE DRAWING

These and other objects, features and advantages of this invention will be apparent from the following detailed description, appended claims and accompanying drawing in which:

DETAILED DESCRIPTION OF THE INVENTION

Figure 1:
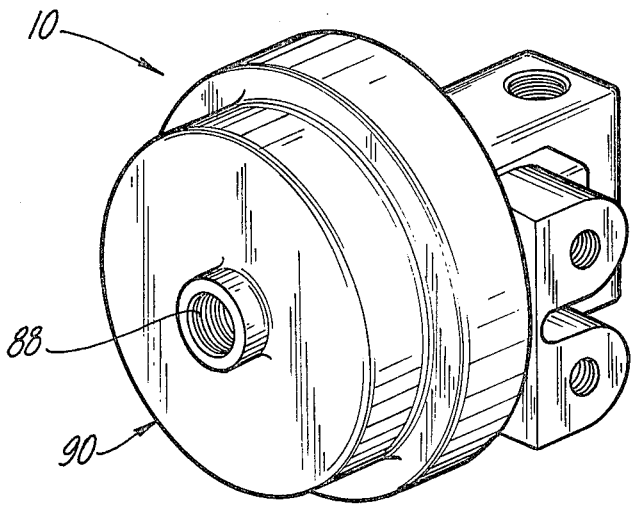
FIG. 1 is a perspective view of a controller embodying this invention.
Figure 2:
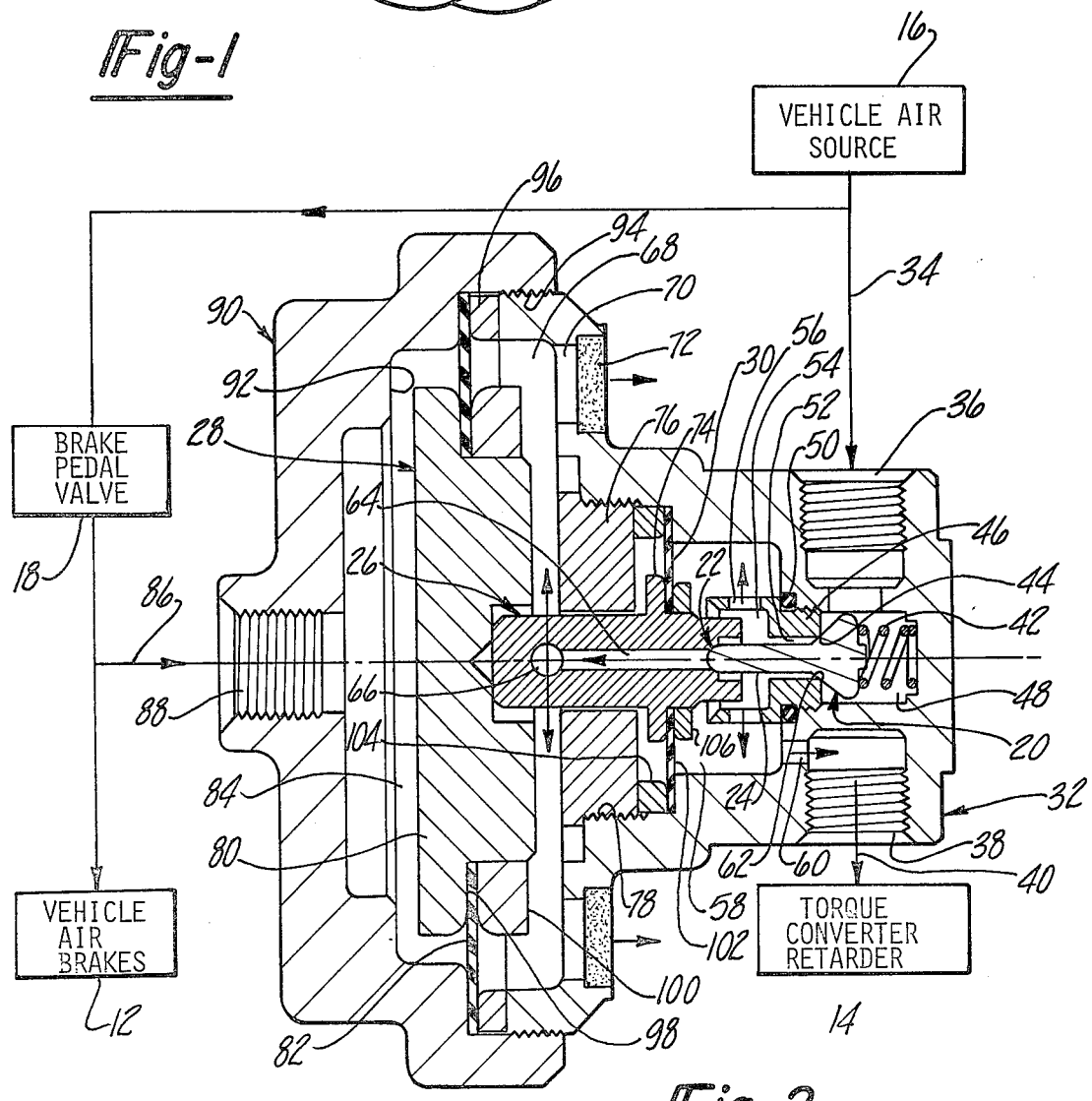
FIG. 2 is a full section of the controller of FIG. 1 and a schematic diagram of the connection of the controller with the air brake system, source of compressed air and retarder of a vehicle.

Referring in more detail to the drawing, FIGS. 1 and 2 illustrate a pneumatic controller 10 embodying this invention. Controller 10 is used in a vehicle having air brakes 12 and a retarder 14. The retarder and brakes are actuated by a vehicle source 16 of compressed air which is typically at a pressure in the range of about 100 to 120 psig. The supply of compressed air to the vehicle brakes is controlled by a brake valve 18. Typically, the valve is connected to a brake pedal actuated by the vehicle operator. The valve varies the pressure of the air supplied to the brakes in proportion to the force applied by the vehicle operator to the brake pedal. The air brakes, retarder, brake valve, pedal and compressed air source may all be of previously well-known conventional construction and arrangement and hence will not be described in further detail.

The rate at which the retarder will slow the vehicle can be varied and is directly proportional to the pressure of the compressed air energizing the retarder. Typically, the retarder begins to be energized or engaged at a pressure of 5 to 10 psig and becomes fully engaged at the maximum brake system operating pressure of 100 to 120 psig. In accordance with this invention, the pressure and flow of air to the retarder 14 is regulated and controlled by inlet and exhaust valves 20 and 22 on a stem 24. The valves are opened and closed by an actuator rod 26 driven by first and second diaphragm assemblies 28 and 30 received in a body 32 of the controller. Compressed air from the source 16 is supplied to the controller through a conduit 34 and a threaded inlet port 36 in the body. Compressed air is supplied to the retarder through a threaded outlet port 38 and a conduit 40.

The flow of compressed air from the inlet port to the outlet port is controlled by the inlet valve 20 which is yieldably urged by a spring 42 toward its closed position of engagement with a mating seat 44 on a retainer plug 46. The plug 46 is threaded into an inlet chamber 48 which communicates with the inlet port 36. A seal is provided between the plug and the inlet chamber by an O-ring 50 received in a counterbore in the body. Compressed air from the inlet port 36 is supplied to the retarder when the inlet valve 20 is open via passages 52, 54 and ports 56 in the plug, and a diaphragm chamber 58 and a passage 60 in the body.

When closed, the exhaust valve 22 bears on a seat 62 in the actuator rod 26. When opened, the exhaust valve 22 bleeds the retarder to the atmosphere surrounding the controller. The exhaust valve bleeds to the atmosphere via the passages 64 and 66 in the actuator rod 26, and an exhaust chamber 68 and passages 70 in the body. To prevent particulate contaminants from entering the controller, filters 72 are disposed in the passages 70.

Exhaust valve 22 is opened by movement of the actuator rod 26 away from the valve or to the left from the position shown in FIG. 2. This movement of the actuator rod 26 is limited by abutment of a flange 74 on the actuator rod with a carrier plug 76 in which the actuator rod is slidably received. The carrier plug 76 is threaded in a counterbore 78 in the body.

In accordance with this invention, the inlet and exhaust valves 20 and 22 are opened and closed by the diaphragm assemblies. The diaphragm assembly 28 has a central disc 80 and a flexible diaphragm 82 received in a chamber 84 in the controller. Compressed air is supplied to the chamber 84 through a conduit 86 connected to the brake pedal valve 18 and a threaded control port 88 in a cover dome 90. Movement of the disc 80 toward the port 88 from the position shown in FIG. 2 is limited by abutment with a shoulder 92 in the cover. The cover is secured to the body by a threaded counterbore 94 which engages mating threads on the body 32.

The outer marginal portion of the diaphragm 82 is secured and sealed in the cover by a retainer ring 96 received in the counterbore 94. The inner marginal portion of the diaphragm 82 is received on and sealed to a flange 98 of the disc 80 by a retainer ring 100 pressed on the disc.

The diaphragm assembly 30 has a flexible diaphragm 102 with its outer marginal portion secured and sealed in the counterbore 78 in the body by a retainer ring 104. The inner marginal portion of the diaphragm 102 is secured and sealed to the flange 74 of the actuator rod 26 by a retainer ring 106 pressed on the rod. If desired, the diaphragm assemblies 28 and 30 can be pistons received in cylinders of suitable chambers.

In accordance with another feature of this invention, the retarder is initially energized and engaged by the controller at a rate which is greater than the rate at which the air brakes are applied by the brake pedal. This is accomplished by the construction of the diaphragm assemblies so that the air pressure applied to the retarder is greater than the air pressure applied by the brake pedal until the air pressure applied to the retarder equals the pressure of the air from the vehicle source 16. This is accomplished by making the effective surface area of the first diaphragm assembly 28 larger than the effective surface area of the second diaphragm assembly 30.

Typically, the effective area of the first diaphragm assembly is about 6–12 times greater than the effective area of the second diaphragm assembly, usually about 8–10 greater and preferably about 9 times greater. For example, if the area of the first diaphragm assembly 28 is 9 times greater than the area of the second diaphragm assembly 30 and the pressure of the air of the vehicle source is 117 psig, the pressure of the air supplied to the retarder will be 9 times greater than the air pressure applied by the brake pedal to the air brakes and the controller until the pressure applied to the retarder equals 117 psig. With this 9-1 ratio the air pressure applied to the retarder will be 117 psig when the air pressure applied by the brake pedal is only 13 psig. Hence, the retarder will be fully engaged even though the brakes are only slightly engaged and will not become fully applied until the pressure applied by the brake pedal is 117 psig. Thus, the controller essentially fully applies or engages the retarder before any significant application of the air brakes occurs. Moreover, the retarder remains fully engaged until the air brakes are almost completely disengaged and then the retarder is disengaged. This decreases wear on the brakes and improves the operator feel of the vehicle brake and retarder system and passenger comfort.

In use the controller 10 engages and disengages the retarder 14 in conjunction with application and release of the air brakes in response to manipulation by the vehicle operator of the brake pedal valve 18. As the operator initially applies force to the brake pedal to slow down the vehicle the compressed air applied to the brakes also acts on the first diaphragm assembly 28 to displace the diaphragm generally axially to the right from the position shown in FIG. 2. This opens the inlet valve 20 to supply compressed air to the retarder by moving the actuator rod 26 and the valve stem 24 in unison to the right against the bias of the spring 42. This opening of the inlet valve 20 admits compressed air from the inlet chamber 48 to the actuator of the retarder via the passages 52, 54 and ports 56 in the plug 46 and the chamber 58, passage 60, and outlet port 38 in the body.

When the retarder is energized, the inlet valve 20 is closed by the diaphragm assemblies. The inlet valve closes when the force produced on the actuator rod 26 by the spring 42 and the second diaphragm assembly 30 slightly exceeds the opposing force on the actuator rod produced by the first diaphragm assembly 28 so that the actuator rod moves to the left away from the valve seat 44 as viewed in FIG. 2. As the actuator rod moves to the left, the inlet valve 20 is closed by the spring 42. This occurs when the pressure of the air applied to the retarder increases sufficiently so that it is essentially equal to the product of the pressure of the air applied to the first diaphragm assembly 28 by the brake pedal valve 18 multiplied by the multiplication factor of the diaphragm assemblies.

During this energization of the retarder, the exhaust valve 22 remains closed because it is continuously engaged with its associated seat 62 on the actuator rod 26 by the bias of spring 42. However, when the operator releases the brakes by removing his foot from or otherwise disengaging the brake pedal valve 18 the diaphragm assemblies open the exhaust valve 22 to deenergize or disengage the retarder by bleeding to the atmosphere the compressed air applied to the retarder. The exhaust valve opens when the force produced on the actuator rod 26 by the second diaphragm assembly 30 exceeds the opposing force produced on the actuator rod by the first diaphragm assembly 28 sufficiently to move the actuator rod away from the exhaust valve 22 or to the left from the position shown in FIG. 2. This occurs when the brakes are released sufficiently so the pressure of the air applied to the retarder and hence the second diaphragm assembly 30 is greater than the product of the pressure of the air applied to the first diaphragm assembly 28 by the brake pedal multiplied by the multiplication factor of the diaphragm assemblies.

Due to the construction of the diaphragm assemblies and this multiplication factor, the retarder begins to be disengaged only after the air brakes are nearly completely disengaged. For example, if the diaphragm assemblies have a multiplication factor of 9 and the air brakes are fully applied when the brake pedal supplies compressed air at 117 psig, the retarder will begin to be released only when the pressure applied to the brakes decreases below 13 psig. Thus, the controller disengages the retarder in a manner which decreases wear of the air brakes and improves the operator feel and passenger comfort of the brake and retarder system.

I claim:

1. A controller for a retarder of a vehicle having a source of compressed gas, gas actuated brakes, and a brake valve for applying and releasing the brakes, comprising; a body; a first valve carried by said body, movable to open and closed positions, and constructed and arranged when opened to couple the source to the retarder to apply compressed gas to the retarder and when closed to decouple the retarder to prevent further compressed gas from the source from being applied to the retarder; a second valve carried by said body, movable to open and closed positions, and constructed and arranged when opened to couple the retarder for bleeding from the retarder compressed gas applied to the retarder and when closed to decouple the retarder to prevent bleeding of the retarder; first and second diaphragm assemblies carried by said body and operably associated with said valves; said first diaphragm assembly being constructed and arranged to move said first valve to its open position in response to initial application by the brake valve of compressed gas to the brakes; said second diaphragm assembly also being operatively associated with said first diaphragm assembly, communicating with the retarder, and constructed and arranged to close said first valve in response to the applying of compressed gas to the retarder by the opening of said first valve when the force produced on said second diaphragm assembly by the applying of such compressed gas to the retarder is substantially equal to the force produced on said first diaphragm assembly by the compressed gas applied to the brakes, said second diaphragm assembly also being constructed and arranged to open said second valve to bleed the retarder when said first valve is closed and the force produced on said second diaphragm assembly by the compressed gas applied to the retarder is greater than the force produced on said first diaphragm assembly by the compressed gas applied to the brakes, whereby the controller applies and disengages the retarder in response to the applying and releasing of the air brakes of a vehicle by the brake valve.

2. The controller of claim 1 which also comprises an actuator rod operably connecting said diaphragm assemblies and said valve.

3. The controller of claim 1 wherein said first diaphragm assembly has an active surface area which is at least twice the active surface area of said second diaphragm assembly.

4. The controller of claim 1 wherein said first diaphragm assembly is constructed and arranged so that it has an active surface area which is in the range of 6 to 12 times greater than the active surface area of said second diaphragm assembly, whereby the controller initially applies the retarder at a greater rate than the brakes are initially applied by the brake valve.

5. The controller of claim 1 which also comprises a valve stem connecting said first and second valves, and an actuator rod connected to said second diaphragm assembly for movement therewith and operably associated with said valve stem and said first diaphragm assembly.

6. The controller of claim 5 wherein said actuator rod is constructed and arranged to bear on said first diaphragm assembly and said valve stem at least when said first valve is open.

7. The controller of claim 6 which also comprises a valve seat carried by said actuator rod and operatively associated with said second valve assembly and wherein said actuator rod is constructed and arranged such that said actuator rod is disengaged from said stem when said second valve is disengaged from said seat assembly to open said second valve.

8. The controller of claim 7 which also comprises a passage in said actuator rod and communicating with said valve seat such that the retarder bleeds through said passage when said second valve is open.

9. The controller of claim 8 wherein said first diaphragm assembly is constructed and arranged so that it has an active surface area which is in the range of 6 to 12 times greater than the active surface area of said second diaphragm assembly, whereby the controller initially applies the retarder at a greater rate than the brakes are initially applied by the brake valve.

10. The controller of claim 9 wherein the surface area of said first diaphragm assembly responsive to the compressed air applied to said control port is at least two times greater than the surface area of said second diaphragm assembly responsive to the compressed air applied to said outlet port.

11. The controller of claim 7 wherein said first diaphragm assembly has an active surface area which is at least twice the active surface area of said second diaphragm assembly.

12. A controller for a motion retarder for a vehicle having a source of compressed air, air brakes and a brake valve for applying and releasing the air brakes, comprising; a body, an inlet port carried by said body and constructed and arranged to be connected to the source of compressed air, an outlet port carried by the body and constructed and arranged to be connected to the retarder, a first valve carried by said body, movable to opened and closed positions, and constructed and arranged when opened to couple said inlet port with said outlet port and when closed to decouple said inlet port from said outlet port, a second valve carried by said body, movable to open and closed positions, and constructed and arranged when opened to couple said outlet port to the atmosphere and when closed to decouple said outlet port from the atmosphere, a control port carried by said body and constructed and arranged to be connected with the compressed air applied to the air brakes by the brake valve, first and second diaphragm assemblies carried by said body and operably associated with said valves, said first diaphragm assembly communicating with said control port and being constructed and arranged to open said first valve in response to initial application of the air brakes, said second diaphragm assembly communicating with said outlet port and being constructed, arranged and operatively associated with said first diaphragm assembly to close said first valve in response to compressed air being admitted to said outlet port from said inlet port when the force produced on said second diaphragm assembly by such compressed air is substantially equal to the force produced on said first diaphragm assembly by the compressed air applied to the brakes, and said second diaphragm assembly also being constructed and arranged to open said second valve to bleed said outlet port to the atmosphere when the force on said second diaphragm assembly produced by the compressed air applied to said outlet port exceeds the force produced on said first diaphragm assembly by the compressed air applied to the brakes.

13. The controller of claim 12 wherein said first diaphragm assembly is constructed and arranged to have a surface area responsive to compressed air applied to said control port which is in the range of 6 to 12 times greater than the surface area of said second diaphragm assembly responsive to compressed air applied to said outlet port, whereby the controller initially engages the retarder at a faster rate than the air brakes are initially applied by the brake valve.

14. The controller of claim 12 which also comprises a valve stem connected to said first and second valves, and an actuator rod operably associated with said valve stem and said diaphragm assemblies for opening and closing said valve assemblies in response to movement of said diaphragm assemblies.

15. The controller of claim 12 which also comprises an actuator rod connected to one of said diaphragm assemblies for movement therewith and operatively associated with the other of said diaphragm assemblies and both of said valve assemblies for opening and closing said valves in response to movement of said diaphragm assemblies.

16. The controller of claim 15 which also comprises a valve seat associated with one of said valves and carried by said actuator rod for movement with respect to its associated valve for opening and closing its said associated valve.

17. The controller of claim 15 which also comprises a valve stem connected to said first and second valves, a valve seat associated with said second valve and carried by said actuator rod for movement in unison with said actuator rod, and a passage in said actuator rod communicating with said valve seat and constructed and arranged to bleed through said passage and to the atmosphere the compressed air applied through said outlet port when said second valve is opened by disengagement from said seat.

18. In a vehicle having air brakes, a source of compressed air, a brake valve for coupling and decoupling the source and the air brakes for applying and releasing the air brakes, and a retarder actuated by compressed air; a controller comprising a body, an inlet port carried by said body and constructed and arranged to be connected to the source of compressed air, an outlet port carried by said body and constructed and arranged to be connected to the retarder, a control port carried by said body and constructed and arranged to be connected to the compressed air applied to the brakes by the brake valve, a first valve carried by said body, movable to open and closed positions, and when opened coupling said outlet port to said inlet port to apply compressed air from the source to the retarder through said outlet port and when closed to decouple said outlet port from the inlet port to prevent additional compressed air from the source from being applied to the retarder, a second valve carried by said body, movable to open and closed positions, and constructed and arranged when opened to couple said outlet port to the atmosphere surrounding said body to bleed compressed air from the retarder to the atmosphere through said outlet port and when closed to decouple the outlet port from the atmosphere to prevent bleeding of the retarder, first and second diaphragm assemblies carried by said body and operatively associated with said valves, said first diaphragm assembly communicating with said control port and constructed and arranged to open said first valve when the air brakes are initially applied by the brake valve, said second diaphragm assembly being operatively associated with said first diaphragm assembly and constructed and arranged to communicate with said outlet port such that when the compressed air applied to said outlet port produces a force on said second diaphragm assembly which is substantially equal to the force produced on said first diaphragm assembly by application of the air brakes said diaphragm assemblies move to close said first valve and when such force produced on said second diaphragm assembly exceeds such force produced on said first diaphragm assembly the diaphragm assemblies move to open said second valve to bleed the retarder through said outlet port to the atmosphere.

19. The controller of claim 18 wherein said first diaphragm assembly is constructed and arranged to have a surface area responsive to the compressed air from the control port which is in the range of 6 to 12 times greater than the surface area of said second diaphragm assembly responsive to the compressed air applied to the retarder through said outlet port, whereby the controller engages the retarder at a faster rate than the air brakes are applied by the brake valve.

20. The controller of claim 18 which also comprises a valve stem connected to said first and second valves, an actuator connected to said second diaphragm assembly for movement therewith and operably associated with said first diaphragm assembly and said valve stem to open and close said first and second valves in response to movement of said diaphragm assemblies.

21. The controller of claim 20 which also comprises a valve seat carried by said actuator, and a passage in said actuator communicating with said valve seat and through which the retarder bleeds when said second valve is opened by disengagement from said valve seat.

* * * * *